United States Patent [19]

Nishimura

[11] Patent Number: 5,205,320

[45] Date of Patent: Apr. 27, 1993

[54] FLOW RATE CONTROL UNIT

[75] Inventor: Noboru Nishimura, Shiga, Japan

[73] Assignee: Kyocera Corporation, Kyoto, Japan

[21] Appl. No.: 731,814

[22] Filed: Jul. 17, 1991

[51] Int. Cl.$^5$ .................... F16K 17/32; F16K 27/00
[52] U.S. Cl. ................................ 137/504; 251/368
[58] Field of Search ............... 137/504, 501, 503; 251/368, 369

[56] References Cited

U.S. PATENT DOCUMENTS

| | | | |
|---|---|---|---|
| 2,917,075 | 12/1959 | Terry | 137/504 |
| 4,147,177 | 4/1979 | Iwatsuki | 137/504 |
| 4,648,424 | 3/1987 | Takahashi et al. | 137/504 |
| 4,801,265 | 1/1989 | Kratochwilla | 251/368 X |
| 4,847,166 | 7/1989 | Kaido et al. | 251/368 X |
| 4,856,758 | 8/1989 | Knapp | 251/368 |

*Primary Examiner*—Stephen M. Hepperle
*Attorney, Agent, or Firm*—Spensley Horn Jubas & Lubitz

[57] ABSTRACT

A flow rate control unit equipped with inner and outer dual cylinders in the housing of the unit, wherein the inner cylinder is normally urged by an elastic member to change the position of the upper section of the inner cylinder depending upon the balance between the above elastic force and the pressure of the fluid supplied in the housing so that the flow rate of the fluid to be discharged from the outlet of the housing can be controlled accordingly, characterized in that the outer and inner cylinders are made of ceramics to eliminate corrosion due to contact with fluid, and that the relationship between the average surface roughness of the inner circumferential surface of the outer cylinder and the average surface roughness of the outer circumferential surface of the inner cylinder is set within a range satisfying a formula to accurately discharge fluid at a constant flow rate.

9 Claims, 2 Drawing Sheets

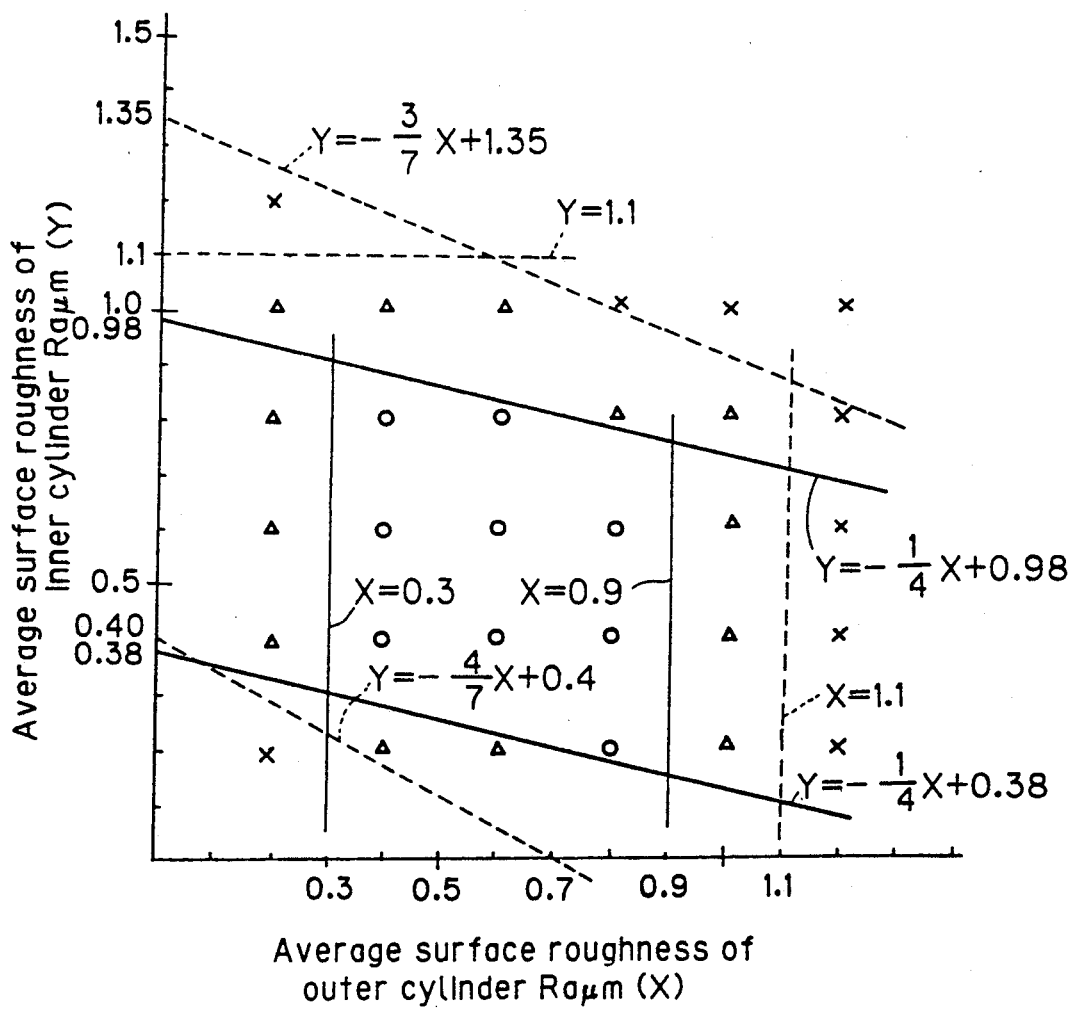

FLOW RATE CONTROL UNIT

BACKGROUND OF THE INVENTION

1. Field of the Invention

The present invention relates to a flow rate control unit particularly used in a vending machine, for example, to supply a constant amount of drinking water.

2. Prior Art

Referring to FIG. 1 which shows a general conventional flow rate control unit to which the present invention is applied, an upper opening OU and a lower opening OD are disposed at the upper and lower ends of a cylindrical housing 8 respectively, and a fluid outlet 1 is disposed on the side of the cylindrical housing 8. An adjustment screw 9 is engaged with the screw section formed on the above-mentioned upper opening OU. A pair of flanges 9A and 9B are formed on the upper and lower circumferences of the adjustment screw 9. Between the pair of the flanges 9A and 9B, an O-ring 11 is fitted in. In a step section 12 located inside the housing 8, an outer cylinder 3 is inserted, the diameter of which is slightly smaller than the inner diameter of the housing 8. A plurality of fluid passing holes 2 leading to the fluid outlet 1 are disposed around the circumference of the outer cylinder 3. In addition, an inner cylinder 7 which slides on the inner sliding surface of the outer cylinder 3 contains an elastic member 6 (coil spring) whose elastic force is normally applied to the inner cylinder 7, the upper end of which is supported by the adjustment screw 9. At the lower section of the inner cylinder 7, a fluid inflow hole 5 is disposed. Around the inner cylinder 7, a fluid storage section 13 is provided. An inlet fitting 14 equipped with a fluid inlet 4 is secured together with the above-mentioned outer cylinder 3 by using a coupling nut 15 to close the above-mentioned opening OD located at the lower section of the housing 8.

In this structure, depending on the pressure difference between the inner section S and the outer section T of the inner cylinder 7, the inner cylinder 7 moves up and down inside the outer cylinder 3 with a ring-shaped slight clearance 18 provided therebetween. The opening area of the fluid passing holes 2 changes depending on the position of the upper edge 17 of the inner cylinder 7 due to the up-and-down movement of the inner cylinder 7. Therefore, if the pressure in the outer section T is larger than that in the inner section S, the inner cylinder 7 moves up to decrease the opening area of the fluid passing holes 2. If the pressure in the outer section T is smaller than that in the inner section S, the inner cylinder 7 moves down to increase the opening area of the fluid passing holes 2. As a result, the discharge flow rate from the fluid outlet 1 is made constant at all times. The fluid stored in the storage section 13 of the inner cylinder 7 form a water film to lubricate the clearance 16. Some of the above-mentioned outer and inner cylinders 3 and 7 of such a flow rate control unit are made of ceramics, such as alumina, instead of conventionally used stainless steel, to prevent corrosion due to drinking water (Japanese Provisional Patent Publication No. 60-121371 for example). The average surface roughness Ra$\mu$m (more particularly the medial line average roughness Ra$\mu$m, but hereafter simply referred to as "the average surface roughness Ra$\mu$m) of the sliding surfaces of these outer and inner cylinders 3 and 7 is about 0.2 $\mu$m (0.8 s); the surfaces are significantly smooth. The medial line average roughness Ra$\mu$m is determined as follows: When a straight line which is drawn in parallel with the average line of a roughness curve divides the areas enclosed by the straight line and the roughness curve into two sides which are equal in area, the straight line is referred to as "a medial line." The medial line average roughness Ra$\mu$m indicates an uneven value (integration value) in the orthogonal two-dimensional directions based on the medial line. This roughness unit is used in Japan (JIS B0601-1982) and the United States of America as an international unit.

In the case of the above-mentioned outer and inner cylinders 3 and 7, a water film is formed between their sliding surfaces to provide a sealing effect. However, even when the above-mentioned storage section 13 for example is provided, if ceramics is used and if the roughness of the surfaces sliding with each other is too small, the circumferential surfaces stick together due to the water film, thereby being apt to cause malfunction. On the other hand, if the surfaces are too rough, resistance occurs due to scratching, eliminating a sealing effect and also being apt to cause malfunction. This fluctuates flow rate control; fluid cannot flow at a constant flow rate at all times.

SUMMARY OF THE INVENTION

To solve the above-mentioned problems, the flow rate control unit of the present invention is generally characterized in that the above-mentioned inner and outer cylinders are made of ceramics, and that a specific relationship is provided between the average surface roughness values Ra$\mu$m of the two cylinders.

Accordingly, the present invention provides a flow rate control unit which is not corroded by fluid and can discharge fluid at a constant flow rate at all times.

BRIEF DESCRIPTION OF THE DRAWINGS

The present invention is described below referring to the drawings of preferred embodiments.

FIG. 2 is a graph showing effective mutual average surface roughness ranges in the relationship between the average surface roughness Ra$\mu$m of the inner cylinder and the average surface roughness Ra$\mu$m of the outer cylinder.

DETAILED DESCRIPTION OF THE PREFERABLE EMBODIMENT

Figure 1:
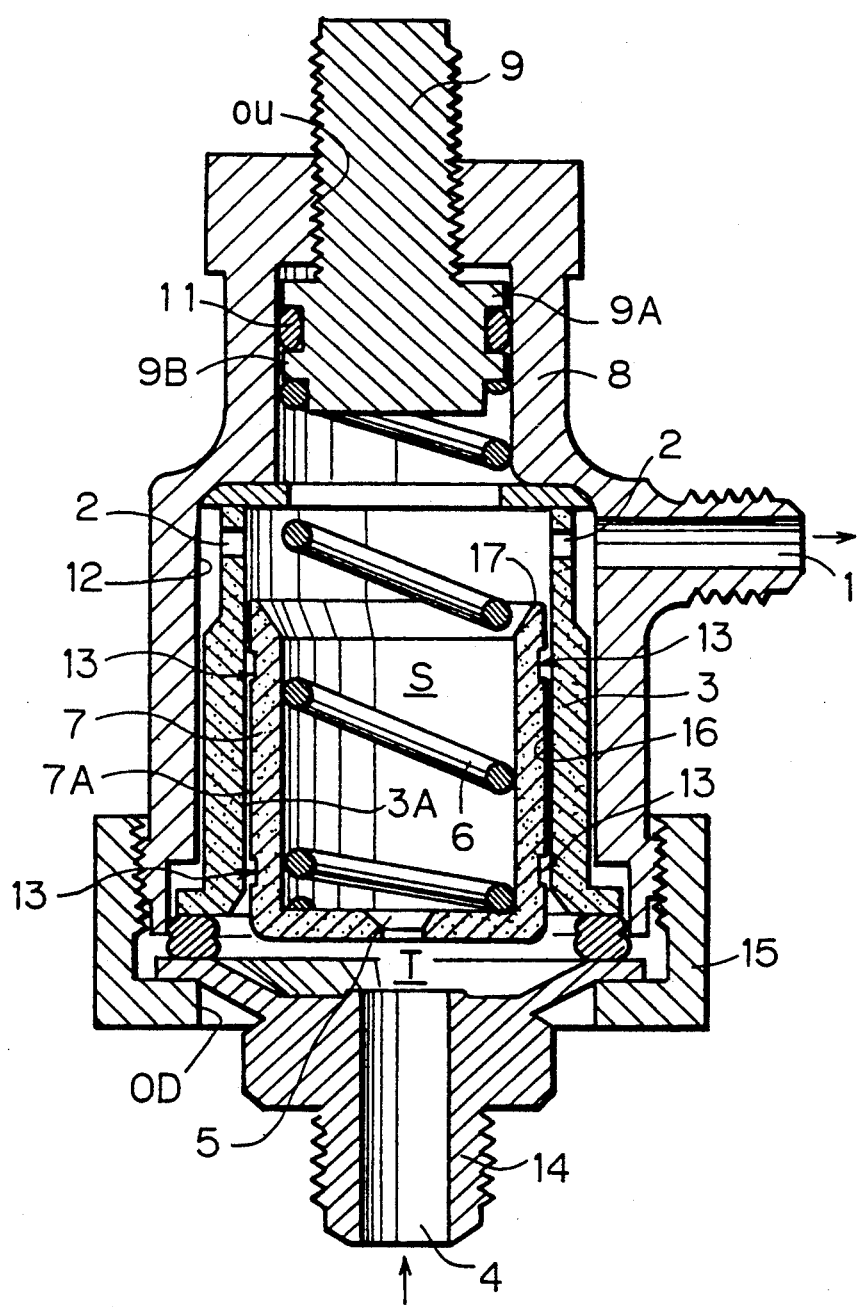
FIG. 1 is a vertical sectional view of a conventional flow rate control unit to which the present invention is applied.

In the flow rate control unit shown in FIG. 1, the inner and outer cylinders 7 and 3 were made of alumina ceramics, and the inner circumferential surface 3A of the outer cylinder 3 and the outer circumferential surface 7A of the inner cylinder 7 were finished to the average surface roughness Ra$\mu$m having the values indicated by the positions of marks o, $\Delta$ and x shown in FIG. 2. These inner and outer cylinders 7 and 3 were incorporated in the flow rate control unit shown in FIG. 1, and a water discharge test was conducted by using the flow rate control unit installed in a commercial, drinking water vending machine.

The test was repeated 500 times. 140 cc of water was charged into the unit each time. The number of large variation times, i.e., the number of variation times when the amount of discharge was not within 140±5 cc in 500 times was used as a criterion. In FIG. 2, mark o indicates that the number is zero, mark $\Delta$ indicates that the number is less than 3 and mark x indicates that the number is 3 or more.

In addition, in FIG. 2 the average surface roughness values Ra$\mu$m of the inner circumferential surface 3A of the outer cylinder 3 were plotted on the X axis and the average surface roughness values Ra$\mu$m of the outer circumferential surface 7A of the inner cylinder 7 were plotted on the Y axis. The areas including marks o and $\Delta$ were enclosed by straight lines and these areas are specified by formulas. The ring-shaped slight clearance 16 between the inner cylinder 7 and the outer cylinder 3 was set to about 15 $\mu$m. This slight clearance 16 can be set in the range of 5 to 35 $\mu$m. If the clearance is less than 5 $\mu$m, the sliding surfaces excessively stick together, thereby causing malfunction. If the clearance is more than 35 $\mu$m, fluid film is difficult to be formed, also causing malfunction or leakage. The clearance should be 7 to 25 $\mu$m preferably.

As shown in FIG. 2, when the inner and outer cylinders (samples indicated by mark x) with their average surface roughness values Ra$\mu$m outside the ranges specified by $A = -4/7$ to $-3/7$, $R = 0.4$ to $1.35$, $X \leq 1.1$ and $Y \leq 1.1$ in the formula $Y = AX + R$ were tested, large discharge variation occurred three or more times in 500 discharging times.

When the inner and outer cylinders (samples indicated by mark $\Delta$) with their average surface roughness values Ra$\mu$m inside the range specified by the above-mentioned formula $Y = AX + R$ were tested, large discharge variation occurred only once or twice in 500 discharging times. Furthermore, when the inner and outer cylinders (samples indicated by mark o) with their average surface roughness values Ra$\mu$m inside the range specified by $R = 0.38$ to $0.98$, $X = 0.3$ to $0.9$ in the formula $Y = -\frac{1}{4}X + R$ were tested, no large discharge variation occurred in 500 discharging times. It is understood that the last range is the most preferable.

In case that alumina ceramics is used as a ceramic material in the above-mentioned examples, it is preferred to apply high-purity alumina ceramics containing more than 99% (wt) $Al_2O_3$ so as to increase corrosion resistance. While on the other hand, nonoxide ceramics, such as silicon nitride and silicon carbide, as well as oxide ceramics, such as zirconia can also be used.

It will be understood from the above that the flow rate control device according to the invention is advantageous in that the outer and inner cylinders are made of ceramics to eliminate corrosion due to contact with fluid as a matter of course, and that a specific relationship is provided between the average surface roughness Ra$\mu$m = X of the inner circumferential surface of the outer cylinder and the average surface roughness Ra$\mu$m = Y of the outer circumferential surface of the inner cylinder that slides along the outer cylinder, thereby preventing malfunction and being capable of accurately discharging fluid at a constant flow rate (without large variations) at all times.

I claim:

1. A flow rate control unit comprising:
    a fluid inlet;
    a fluid outlet;
    a ceramic outer cylinder defining a plurality of fluid passing holes coupled to the fluid outlet;
    a ceramic inner cylinder defining a fluid inflow hole therein coupled to the fluid inlet; and
    an elastic member resiliently coupled to said inner cylinder;
    said inner cylinder being movable inside said outer cylinder depending on the pressure difference between an interior and an exterior of said inner cylinder for changing the opening area of said fluid passing holes thereby maintaining the flow rate of a liquid discharged from said fluid inlet to said fluid outlet constant, said outer cylinder having an inner circumferential surface and said inner cylinder having an outer circumferential surface spaced a distance from said inner circumferential surface, wherein the relationship between an average surface roughness Ra$\mu$m = X of the inner circumferential surface of said outer cylinder and an average surface roughness Ra$\mu$m = Y of the outer circumferential surface of said inner cylinder satisfies the formula $-4/7\ X + 0.4 \leq Y \leq -3/7\ X + 1.35$
    where $X \leq 1.1$ and $Y \leq 1.1$.

2. A flow rate control unit according to claim 1, wherein said relationship is defined by the formula $-\frac{1}{4} X + 0.38 \leq Y \leq -\frac{1}{4} X + 0.98$
    where $0.3 \leq X \leq 0.9$.

3. A flow rate control unit according to claim 1 or 2, wherein said distance between said outer circumferential surface and said inner circumferential surface is in a range of 5 to 35 $\mu$m.

4. A flow rate control unit according to claim 1 or 2 wherein said outer and inner cylinders are made of alumina ceramics.

5. A liquid flow rate control assembly comprising a ceramic outer cylinder and a ceramic inner cylinder received within said outer cylinder, said inner cylinder being movable within said outer cylinder for controlling the flow rate, said outer cylinder having an inner circumferential surface and said inner cylinder having an outer circumferential surface spaced a distance from said inner circumferential surface wherein an average surface roughness Ra$\mu$m = X of said inner circumferential surface and an average surface roughness Ra$\mu$m = Y of said outer circumferential surface have a relationship defined by the formula $$-4/7 X + 0.4 \leq Y \leq -3/7 X + 1.35$$

where $X \leq 1.1$ and $Y \leq 1.1$.

6. A flow rate control assembly according to claim 5, wherein said relationship is defined by the formula $$-\tfrac{1}{4} X + 0.38 \leq Y \leq -\tfrac{1}{4} X + 0.98$$

where $0.3 \leq X \leq 0.9$.

7. A flow rate control assembly according to claim 5, wherein said distance between said outer circumferential surface and said inner circumferential surface is in a range of 5 to 35 $\mu$m.

8. A flow rate control assembly according to claim 7, wherein said distance is in a range between 7 and 25 $\mu$m.

9. A flow rate control assembly according to claim 5, wherein said inner and outer cylinders are formed from alumina ceramics.

* * * * *